United States Patent [19]

Kalafus et al.

[11] 4,040,999

[45] Aug. 9, 1977

[54] POLLUTION FREE METHOD OF MAKING PHENOL FORMALDEHYDE RESOLE TIRE CORD DIP AND PRODUCT

[75] Inventors: Edward Florent Kalafus, Akron; Satish Chander Sharma, Mogadore, both of Ohio

[73] Assignee: The General Tire & Rubber Company, Akron, Ohio

[21] Appl. No.: 692,242

[22] Filed: June 3, 1976

[51] Int. Cl.$^2$ .................... C08L 61/10; C08L 61/12
[52] U.S. Cl. ............... 260/29.3; 156/110 A; 428/375; 428/395
[58] Field of Search .............. 260/29.3, 844, 846; 428/395

[56] References Cited

U.S. PATENT DOCUMENTS 3,888,805  6/1975  Van Gils et al. .................... 260/29.3
3,930,095  12/1975 Van Gils et al. .................... 428/251

Primary Examiner—Theodore E. Pertilla

[57] ABSTRACT

Phenol formaldehyde resole is made by a low catalyst level process which eliminates the need to isolate the resin from the reaction mixture. The resole is blended with a vinyl pyridine latex and a resorcinol based curing agent and is used as a cord dip. The vinyl pyridine latex may be a latex blend. The dipped cord is used as reinforcement in rubber tires.

13 Claims, No Drawings

POLLUTION FREE METHOD OF MAKING PHENOL FORMALDEHYDE RESOLE TIRE CORD DIP AND PRODUCT

BACKGROUND OF THE INVENTION

The present invvention is directed to a method of making a reaction product containing phenol formaldehyde resole and its use in combination with a vinyl pyridine latex [2] for tire cord dips. The phenol formaldehyde resole [1] is made by a process without isolating any of the products. The reaction product is referred to herein as a phenol formaldehyde resin. A cord coated with the dip composition of the present invention is used to reinforce rubber products such as ties.

[1] Resole is used in its generic sense to describe a family of species.
[2] Latex is used in its generic sense to describe a family of species.

Cord dips based upon the use of a blend of resorcinol formaldehyde resole and a vinyl pyridine copolymer latex are very effective and are widely use.

Cord dips based upon trimethylol phenol are also known, see U.S. Pat. Nos. 3,888,805 and 3,930,095 of van Gils and Kalafus. Cord dips utilizing a mixture of phenol formaldehyde resin and resorcinol formaldehyde resin with an aldehyde latex are disclosed in U.S. Pat. No. 2,748,049 of Kalafus.

While the cord dips of the prior art are quite useful and provide good adhesion between cords and rubber, there are certain problems inherent in their use. Resorcinol, for example, is relatively expensive when compared with phenol. In addition there is only one commercial supplier of resorcinol in the U.S., if not the world. Supplies of resorcinol were recently, though not presently, limited. In addition resorcinol formaldehyde resoles are unstable and have a shelf life of only a few days even at low concentration. Vinyl pyridine is expensive. Trimethylol phenol can be obtained at again a relative high price if one can induce a supplier to manufacture the trimethylol phenol. Trimethylol phenol is not presently being manufactured, is unstable, condensing into a resin on room temperature storage and must be refrigerated if storage is contemplated.

In the manufacture of trimethylol phenol, an excess of formaldehyde is added in the first prior art step. The excess is then removed. The disposal of the removed formaldehyde results in a disposal or a water pollution problem. The removal of the formaldehyde also results in a time consuming and expensive process step. Catalyst removal steps of the prior art have involved ion exchange treatment. The same can be said of the salt forming and crystallization steps employed to isolate the trimethylol phenol salts. The purification process involved in isolating the trimethylol phenol generates even more waste products containing phenols and formaldehyde. Phenolic and formaldehyde pollutants are very difficult, if not impossible, to remove by sewage treatment and by water treatment normally used for drinking water supplies. This often results in off-taste and odor in drinking water. The off-taste and odor is carried over even by distillation of the polluted drinking water supply.

SUMMARY OF THE INVENTION

We have unexpectedly discovered that phenol formaldehyde resole can be made and used in a cord dip without the necessity of isolation and purification of the resole. The products of our process are not adversely affected by the presence of formaldehyde, salts, phenols and other by-products which were discarded by the prior art. Our process eliminates all pollution problems caused by the prior art purification steps. Our process also eliminates the prior art purification steps and the expense incurred thereby. Our process also reduces the demand for expensive resorcinol and expensive vinyl pyridine by replacing them in part with inexpensive phenol and a relatively cheaper latex respectively. Our process also replaces expensive trimethylol phenol with inexpensive phenol formaldehyde resole. In addtion the phenol formaldehyde resoles of the present invention are much more stable than the resorcinol formaldehyde resoles and trimethylol phenol, having a shelf life of about one hundred days.

DESCRIPTION OF THE PREFERRED EMBODIMENTS

The process of the present invention for making a cord dip comprises:

a. reacting in the presence of from about 0.01 to 0.8 mole, preferably 0.0375 to 0.15 mole, of a base catalyst,
  1. one mole of phenol with
  2. from about 1.0 to 4.0 and preferably 1.5 to 3.0 mole of formaldehyde to form a reaction mixture containing a phenol formaldehyde resole and b. without separating the resole from the reaction mixture, adding based on the following ingredients by dry weight
  1. a minor amount of a curing agent consisting of resorcinol and/or resorcinol formaldehyde resin and
  2. a major amount of an alkaline dispersion of a rubbery vinyl pyridine copolymer.

The base catalyst preferably is selected from the group comprising sodium hydroxide, and potassium hydroxide. Triethylamine, triethanol amine, may also be operable but are not preferred. The type of the basic catalyst is not critical and any of the catalysts known to be useful in the reaction between phenol and formaldehyde to form resoles can be used. The pH after the addition of the base catalyst preferably has a value of 8.0 to 9.5.

The temperature used in forming the phenol formaldehyde resole is not critical and can range from 10° C to 100° C. The preferred range is 25° C to 80° C. The problems with the upper range are controlling the reaction and the production of high molecular weight polymer. The problems of low tempratures include long reaction times.

The formaldehyde can be an aqueous solution of formaldehyde or compound of yielding formaldehyde such a paraformaldehyde. From 1.5 to 3.0 moles of formaldehyde for each mole of phenol is preferred. Larger amounts of formaldehyde are undesirable and do not improve the adhesion of the dipped cord to rubber.

Water is used in an amount sufficient to provide for the desired dispersion of the rubber or latex particles, for the solution of the phenol formaldehyde resole, for the soluton or dispersion of the curing agent and for the proper solids content to get the necessary pick-up of solids on and penetration between the fibers of the dipped cord. The amount of water present can range from 100 to 1100 parts, preferably from 150 to 900 parts per 100 parts of solids.

Curing agents which can be employed in the practice of the present invention include resorcinol and resorcinol formaldehyde resins. The resins include the base catalyzed resoles and the acid catalyzed novolaks. The ratio of formaldehyde to resorcinol in the resoles can range up to a value of 4:1, any ratio down to 0:1 is also operable. In the novolaks it is preferred not to go over a ratio of 1:1.

The dip thus comprises an aqueous dispersion of the rubbery vinyl pyridine copolymer latex, the solution of the phenol formaldehyde resole, and the solution or dispersion of the curing agent.

The weight ratio of the phenol formaldehyde to curing agent has a value of from 6:1 to 1:2 and preferably from 3:1 to 1:1. The resin and curing agent can also be copolymerized but this is not preferred. The ratio (dry) of the vinyl pyridine copolymer to the mixture of phenol formaldehyde resole and curing agent in the dip is from about 100:5 to 100:75 parts by weight, preferably from about 100:10 to 100:35 parts by weight. The ratio of phenol formaldehyde resin to resorcinol or resorcinol formaldehyde resin has a value of 1:2 to 6:1 and preferably 1:1 to 3:1. Sufficient alkaline material is present in the phenolic solution to prevent premature coagulation of the rubbery copolymer and to solubilize the phenol formaldehyde resole.

The type of rubber emulsion or latex preferably used in the tire cord dip bath of this invention is a latex of a copolymer of a vinyl pyridine and a conjugated dieolefin having 4 to 6 carbon atoms. The rubber latex comprises an aqueous emulsion or dispersion of a copolymer of 50 to 98 percent by weight of a conjugated diolefin having 4 to 6 carbon atoms, 2 to 40 percent of a vinyl pyridine and 0 to 48 percent of a styrene with the future qualification that the percentages of the three components add up to 100% Examples of suitable vinyl pyridines are 2-vinyl pyridine, 4-vinyl pyridine, 2-methyl-5-vinyl pyridine and 5-ethyl-2-vinyl pyridine.

In practicing the present invention, it is usually preferred to use an emulsion or latex of a copolymer of from about 60 to 90 percent by weight of 1,3-butadiene, 0 to 32 percent styrene and 3 to 22 percent of 2-vinyl pyridine, with the further qualification that the percentages of the three components add up to 100%. Excellent results are obtained using a latex of a terpolymer of about 70 percent by weight of 1,3-butadiene, 15 percent styrene and 15 percent 2-vinyl pyridine having a total solids content of around 30 to 50 percent by weight. Blends of latices may be used such as blend of a 1,3-butadiene/2-vinyl pyridine rubbery copolymer latex and a 1,3-butadiene/styrene rubbery copolymer latex or a blend of a 1,3-butadiene/styrene/2-vinyl pyridine rubber copolymer latex and a 1,3-butadiene styrene rubbery copolymer latex so long as the percent by weight ratio of total monomers in the copolymers is within the ranges as specified above. The ratio of the vinyl pyridine latex to styrene butadiene latex preferably has a value of 3:1 to 1:3. The vinyl pyridine content of the blend is preferably at least 3%. The pH of the latices should be similar and the surfactants and stabilizers should be compatible to avoid coagulation on blending or mixing of the latices. The amounts of polymerization ingredients and the polymerization conditions to use are well known to the art. See "Vinyl and Related Polymers,"Schildknecht, John Wiley & Sons, Inc., New York, 1952; "Synthetic Rubber," Whitby, Davis & Dunbrook John Wiley & Sons. Inc., New York, 1954; "Emulsion Polymerization, "Bovey Kolthoff, Medalia and Meehand, Interscience Publishers, Inc., New York, 1955. Emulsions or latices of rubbery vinyl pyridine copolymers for use in cord dips are shown by U.S. Pat. Nos. 2,561,215; 2,615,826 and 3,437,122.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67

In order to apply the adhesive dip to the cords in a reliable manner, the cords are fed through the adhesive dip bath containing the rubber and the phenolic composition and into a drying oven where they are dried. In each case the adhesive-coated cords leaving the dip are dried in the oven at from about 300 to 500° F., or at a temperature below the temperature at which the fibers of the cord would lose their tensile strength, for from about 30–300 seconds. The time the cord remains in the dip is about a second or so or at least for a period of time sufficient to allow wetting of the cord and penetration of the fibers of the cord by the adhesive mixture.

The H-adhesion test referred to above measures the static adhesion of the dried adhesive coated fibers to cured rubber.

In each case the rubber test specimens are made from one of the three standard type rubber compositions using the following three recipes:

| STOCK A | PARTS BY WEIGHT |
| --- | --- |
| Natural Rubber | 50 |
| Butadiene-styrene rubbery copolymer average 23.5% bound styrene, SBR-1502, emulsion polymerized | 50 |
| High abrasion furnace carbon black | 35 |
| "Endor", activated zinc salt of pentachloro – thiophenol, peptizing agent, duPont | 0.65 |
| "Circosol" 2XH, napthenic type oil Sun Oil Company | 7.0 |
| Zinc Oxide | 3.0 |
| Stearic Acid | 1.0 |
| "AgeRite Spar", a mixture of mono-, di- and tri-styrenated phenols, antioxidant, R. T. Vanderbilt Co., Inc. | 1.0 |
| "Picco 100", alkyl aromatic polyindene resin, reinforcing and processing oil, Pennsylvania Industrial Chemical Corp. | 2.0 |
| Diphenylguanidine | 0.5 |
| N-Oxydiethylene benzothiazole-2-sulfenamide | 0.9 |
| Sulfur (insoluble) | 2.6 |
| Petroleum oil (in sulfur) | 0.65 |

| STOCK B | PARTS BY WEIGHT |
| --- | --- |
| Natural Rubber | 46.5 |
| Butadiene-styrene rubbery copolymer, average 23.5% bound styrene, SBR-1500, emulsion polymerized | 38.5 |
| Polybutadiene, solution polymerized BD, about 93% cis-1,4, Raw Mooney ML-4 at 212° F. about 40-50 | 15.0 |
| Carbon black, fast extrusion furnace | 45.0 |
| Hydrated silica, "Hi-Sil" 233, PPG Industries, Inc. | 15.0 |
| "BLE" 25 antioxidant, a high temperature reaction product of diphenylamine and acetone, Naugatuck Chemical Division of Uniroyal | 2.0 |
| Processing oil, a blend of highly aromatic petroleum fractions | 5.0 |
| Zinc oxide | 3.0 |
| Stearic acid | 1.5 |
| "Cohedur" RL, a 1:1 mixture of resorcinol and "Cohedur" A (the pentamethyl ether of hexamethylol melamine) which is a colorless viscous liquid which liberates formaldehyde on heating. Naftone, Inc. | 4.7 |
| N-tert-butyl-2-benzothiazole-sulfenamide | 1.2 |

-continued

| STOCK C | PARTS BY WEIGHT |
|---|---|
| Natural Rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212° F. about 40-50) | 20.00 |
| Carbon black, fast extrusion furnace | 35.00 |
| Carbon black, high abrasion furnace (high structure) | 35.00 |
| Alkyl aromatic polyindene resin, reinforcing and processing aid, Picco 100, Pennsylvania Industrial Chemical Corp. | 4.5 |
| Naphthenic oil, Circosol type 2XH, Sun Oil Company | 32.80 |
| Zinc Oxide | 3.8 |
| Stearic Acid | 1.5 |
| Mixture of mono, di and tristyrenated phenols, AgeRite Spar, R. T. Vanderbilt Co. Inc. antioxidant | 1.2 |
| Benzothiazyl disulfide, Altax, R. T. Vanderbilt Co., Inc., accelerator | 1.2 |
| Tetramethyl thiuram monosulfide, active ingredient Thionex accelerator, E. I. DuPont de Nemours & Co., Inc. | 0.1 |
| Crystex, about 80% insoluble sulfur & 20% petroleum oil, Stauffer Chemical Company | 3.0 |

(Santocure NS row continued from previous: "Santocure" NS, Monsanto Chemical Co. Sulfur — 3.0)

In every case the cords to be tested are placed in parallel positions in a multiple-strand mold of the type described in the single cord H-pull adhesion test designated ASTM D-2138-67, the mold is filled with unvulcanized rubber of the above composition, the cords being maintained under a tension of 50 grams each, and the rubber is cured 20 minutes at around 151° C. to the elastic state. Each rubber test specimen is 0.63 cm thick and has a 0.95 cm cord embedment.

After the rubber has been cured, the hot reticulate cured rubber piece is removed from the mold, cooled and H-test specimens are cut from said piece, each specimen consisting of a single cord encased in rubber and having each end embedded in the center of a rubber tab or embedment having a length of 2.54 cm. The specimens are then aged at least 16 hours at room temperature. The force required to separate the cord from the rubber is then determined at room temperature or 121° C. using an INSTRON tester provided with specimen grips at a crosshead speed of 15.2 cm per minute. The force in Newtons required to separate the cord from the rubber is the H-adhesion value.

The resorcinol formaldehyde novalak used in the following examples contained 0.6 moles of formaldehyde per mole of resorcinol. The novolak contains 15% unreacted resorcinol, 42½% of a compound having the formula R—CH$_2$—R where R is resorcinol and 42½% of a compound having the formula R—CH$_2$R—CH$_2$—R.

The following examples will serve to illustrate the invention with more particularity to those skilled in the art. In these examples as elsewhere in the specification and claims parts and percentages are by weight (dry) unless otherwise indicated. P represents phenol and F represents formaldehyde and PF represents phenol formaldehyde resin in the present specification.

EXAMPLE I

This example illustrates how the phenol formaldehyde resole of the present invention can be used to replace trimethylolphenol.

Two phenol formaldehyde resoles, labeled Resin No. 1 and 2 in the following table, were prepared. The following table lists the ingredients placed into a reactor and the reaction condition.

|  | Resin No. 1 | Resin No. 2 |
|---|---|---|
| Recipe[1] (moles) |  |  |
| Phenol | 1.00 | 1.00 |
| Formaldehyde | 3.00 | 3.00 |
| Sodium Hydroxide | 0.075 | 0.075 |
| Water | 9.36 | 9.36 |
| Reaction temp., ° C | 80[2] | 80[2] |
| Reaction time, hrs. | 1 | 2 |
| Unreacted Formaldehyde[3] | 7.7% | 6.5% |
| pH | 8.9 | 8.8 |
| TSC, %[4] | 45.1 | 45.5 |

[1]Given in moles of reactants for clarity of presentation. In actual practice, if 90% phenol solution, 37% formaldehyde solution, and 100% sodium hydroxide are used, no additional water is needed.
[2]Temperature of the polymerizer bath.
[3]Refers to the level of formaldehyde in the final resin. Conversions of formaldehyde ranged between 65-75% resulting in a minimal yield of trimethylol phenol. Following Examples have similar yields.
[4]Calculated on the basis of total phenol consumption. Thin layer chromatography showed approximately 1-2% unreacted phenol.

The resins produced above were then incorporated into a series of five cord dips, the recipes of which are set forth below.

| | DIP RECIPES | | | | |
|---|---|---|---|---|---|
| | Dip Recipe No. | | | | |
| Contents (Parts) | 1 | 2 | 3 | 4 | 5 |
| Vinyl pyridine latex[1] | 100 | 100 | 100 | 100 | 100 |
| Resin | 16.7 | 15.4 | 12.5 | 9.1 | 7.2 |
| Resorcinol | 3.3 | 4.6 | 7.5 | 10.9 | 12.8 |
| TSC[2] | 40% | 40% | 40% | 40% | 40% |

[1]A terpolymer of 70% 1,3-butadiene, 15% styrene and 15% 2-vinyl pyridine having a solids content of 40%.
[2]All dips were aged overnight before cutting down to 15% TSC (total solids content) for dipping.

Five additional cord dips were made using the same five recipes set forth above with the single exception that the resin in each case was replaced with trimethylolphenol.

Commercial polyamide tire cords were dipped in the above described cord dips with the following results.

| | ADHESION DATA FOR COMPARISON OF RESIN 1, RESIN 2 AND TRIMETHYLOLPHENOL | | | | | |
|---|---|---|---|---|---|---|
| | H-ADHESION, KEVLAR[1] TO STOCK B | | | | | |
| | TRIMETHYLOLPHENOL | | RESIN 1 | | RESIN 2 | |
| DIP RECIPE | RT[2] | 121° C | RT | 121° C | RT | 121° C |
| 1 | 253 | 155 | 278 | 161 | 252 | 155 |
| 2 | 263 | 160 | 270 | 161 | 275 | 163 |
| 3 | 250 | 159 | 248 | 143 | 260 | 151 |
| 4 | 235 | 158 | 237 | 144 | 228 | 141 |

-continued

ADHESION DATA FOR COMPARISON OF
RESIN 1, RESIN 2 AND TRIMETHYLOLPHENOL
H-ADHESION, KEVLAR[1] TO STOCK B

| DIP RECIPE | TRIMETHYLOLPHENOL | | RESIN 1 | | RESIN 2 | |
|---|---|---|---|---|---|---|
| | RT[2] | 121° C | RT | 121° C | RT | 121° C |
| 5 | 227 | 153 | 225 | 150 | 232 | 146 |

[1]Kevlar is an aromatic polyamide tire cord available from DuPont.
[2]RT means room temperature.

EXAMPLE II

This example illustrates the effect that the amount of catalyst, used to form the phenol formaldehyde resole, has on cord adhesion and resole stability.

The following phenol formaldehyde resoles were prepared using the reactants and conditions set forth in the table below.

| | Resin No. 3 | Resin No. 4 | Resin No. 5 |
|---|---|---|---|
| Recipe[1] (moles) | | | |
| Phenol | 1.00 | 1.00 | 1.00 |
| Formaldehyde | 3.00 | 3.00 | 3.00 |
| Sodium Hydroxide | 0.0375 | 0.075 | 0.15 |
| Water | 9.36 | 9.36 | 9.36 |
| Reaction temp., ° C | 80[2] | 80[2] | 80[2] |
| Reaction time, hrs. | 3 | 1 | 1 |
| Unreacted Formaldehyde[3] | 8.40% | 7.87% | 5.65% |
| pH | 8.2 | 9.0 | 9.2 |
| Brookfield Visc., cps | 16.5 | 15.5 | 44.5 |
| Water Tolerance, %[4] | | 10,000+ | |
| TSC, %[5] | 44.5 | 45.0 | 48.0 |

[1]Given in moles of reactants for clarity of presentation. In actual practice, if 90% phenol solution, 37% formaldehyde solution, and 100% sodium hydroxide are used, no additional water is needed.
[2]Temperature of the polymerizer bath.
[3]Refers to the level of formaldehyde in the final resin. Conversions of formaldehyde ranged between 65-75%.
[4]Defined as the weight percent of water added before turbidity appears.
[5]Calculated on the basis of total phenol consumption.

Thin layer chromatography showed approximately 1-2% unreacted phenol.

Resin No. 3, 4 and 5 were then used to formulate a series of cord dips according to the following recipes.

| CONTENTS | DIP RECIPE No. | | |
|---|---|---|---|
| | 1 | 2 | 3 |
| Vinyl pyridine latex[1] | 100 | 100 | 100 |
| Resin | 16.7 | 15.4 | 12.5 |
| Resorcinol | 3.3 | 4.6 | 7.5 |
| TSC[2] | 40% | 40% | 40% |

[1]A terpolymer of 70% 1,3-butadiene, 15% styrene and 15% 2-vinyl pyridine having a solids content of 40%.
[2]All dips were aged overnight before cutting down to 15% TSC for dipping.

Commericial aromatic polyamide tire cords were dipped in the above described formulation with the following results.

EFFECT OF CATALYST CONCENTRATION OF RESIN ON ADHESION OF KEVLAR TO STOCK B

| DIP RECIPE | RESIN NO. (CATALYST LEVEL) | | | | | |
|---|---|---|---|---|---|---|
| | 3 (0.0375) | | 4 (0.075) | | 5 (0.15) | |
| | RT | 121° C | RT | 121° C | RT | 121° C |
| 1 | 241 | 176 | 276 | 163 | 268 | 172 |
| 2 | 286 | 181 | 285 | 169 | Dip solidified | |
| 3 | 273 | 168 | 252 | 153 | Dip solidified | |

The dips made with resin 3 had a shelf life of 5-8 weeks at room temperature compared to about 6-12 weeks for those made with resin 4. This is because of the longer reaction time in the preparation of resin 3 as compared with resin 4 used in these dips. All dips solidified in 2-3 days at 50° C. The dips with resin 5 had a shelf life of less than 2 weeks (two of the three dips actually lasted less than one day).

EXAMPLE III

The preparation of phenol formaldehyde resoles was studied at 50° C., 60° C. and 80° C. Three resin recipes were used (phenol formaldehyde mole ratios of 1:3.25, 1:3.0 and 1:2.5). The reaction times were varied to give approximately the same unreacted formaldehyde level at various reaction temperatures for each of the two recipes. The resins thus prepared were tested for their adhesive quality in Kevlar, aromatic polyamide, dips.

The following table lists the reactor inputs and the reaction conditions used to make the phenol formaldehyde resoles.

| PROPERTY | RESIN NO. | | | | | | |
|---|---|---|---|---|---|---|---|
| | 6 | 7 | 8 | 9 | 10 | 11 | 12 |
| Recipe (moles) | | | | | | | |
| Phenol | 1.00 | 1.00 | 1.00 | 1.00 | 1.00 | 1.00 | 1.00 |
| Formaldehyde | 2.50 | 2.50 | 2.50 | 3.00 | 3.00 | 3.00 | 3.00 |
| Sodium Hydroxide | 0.075 | 0.075 | 0.075 | 0.075 | 0.075 | 0.075 | 0.075 |
| Water | 7.91 | 7.91 | 7.91 | 9.36 | 9.36 | 9.36 | 9.67 |
| Reaction temp., ° C. | 50 | 60 | 80 | 50 | 60 | 80 | 60 |
| Reaction time, hrs. | 16 | 6 | 1 | 16 | 8 | 1 | 8 |
| Unreacted Formaldehyde | 5.67% | 5.97% | 5.07% | 8.00% | 7.60% | 7.87% | 8.67% |
| pH | 9.05 | 9.10 | 9.0 | 9.1 | 9.10 | 9.0 | 8.9 |
| Brookfield Visc., cps | 14.0 | 14.0 | 17.5 | 16.5 | 13.5 | 15.5 | 13.0 |
| Water Tolerance, % | | | 400 | | 10,000+ | 10,000+ | 10,000+ |
| TSC, % | 49.0 | 48.8 | 49.7 | 44.8 | 44.5 | 45.0 | 43.1 |

The resins produced above were then incorporated into a series of three cord dips, the recipes of which are set forth below.

| CONTENTS (PARTS) | DIP RECIPE No. | | |
|---|---|---|---|
| | 1 | 2 | 3 |
| Vinyl pyridine latex[1] | 100 | 100 | 100 |
| Resin | 16.7 | 15.4 | 12.5 |

-continued

| CONTENTS | DIP RECIPE No. | | |
|---|---|---|---|
| (PARTS) | 1 | 2 | 3 |
| Resorcinol | 3.3 | 4.6 | 7.5 |
| TSC[2] | 40% | 40% | 40% |

[1] A terpolymer of 79% 1,3-butadiene, 15% styrene and 15% 2-vinyl pyridine having a solids content of 40%.
[2] All dips were aged overnight before cutting down to 15% TSC (total solids content) for dipping.

Commercial aromatic polyamide tire cords were dipped in the above described cord dips with the following results.

ROOM TEMPERATURES, H-ADHESION IN NEWTONS OF KEVLAR TO STOCK B

| | MOLE RATIO | 1:2.50 | | | 1:3.00 | | | 1:3.25 |
|---|---|---|---|---|---|---|---|---|
| DIP RECIPE | RESIN NO. TEMPATURE | 6<br>50° C | 7<br>60° C | 8<br>80° C | 9<br>50° C | 10<br>60° C | 11<br>80° C | 12<br>60° C |
| 1 | | 277 | 265 | 257 | — | — | 276 | — |
| 2 | | 261 | 265 | 248 | 256 | 278 | 285 | 280 |
| 3 | | — | — | — | 243 | 248 | 252 | 266 |

The H-adhesion data reported in the above table may be used to elucidate the effect of mole ratio of phenol:-formaldehyde on the adhesion of Kevlar to Stock B. It is seen that the initial mole ratio of the reactants (in the range studied) does not affect adhesion significantly when the dip recipe is adjusted to its optimum level. The data also shows that the reaction time and temperature can be adjusted to attain optimum resin properties for good adhesion.

EXAMPLE IV

This example sets forth the results obtained adhering Kevlar cord to various rubber stocks using various cord dip recipes to treat the Kevlar cord.

Three phenol formaldehyde resoles, Resin Nos. 13, 14 and 15 were prepared as set forth below.

| | RESIN NO. | | |
|---|---|---|---|
| | 13 | 14 | 15 |
| Recipe (moles) | | | |
| Phenol | 1.00 | 1.00 | 1.00 |
| Formaldehyde | 3.00 | 3.00 | 3.25 |
| Sodium Hydroxide | 0.0375 | 0.075 | 0.075 |
| Water | 9.36 | 9.36 | 9.67 |
| Reaction temp., ° C | 80 | 60 | 60 |
| Reaction time, hrs. | 3 | 8 | 8 |
| Unreacted Formaldehyde | 8.40% | 7.60% | 8.67% |
| ph | 8.2 | 9.10 | 8.9 |
| Brookfield Visc., cps | 16.5 | 13.5 | 13.0 |
| Water Tolerance, % | | 10,000+ | 10,000+ |
| TSC, % | 44.5 | 44.5 | 43.1 |

The resins produced were then incorporated into a series of three cord dips, the recipes of which are set forth below.

| CONTENTS | DIP RECIPE No. | | |
|---|---|---|---|
| (PARTS) | 1 | 2 | 3 |
| Vinyl pyridine latex[1] | 100 | 100 | 100 |
| Resin | 16.7 | 15.4 | 12.5 |
| Resorcinol | 3.3 | 4.6 | 7.5 |
| TSC[2] | 40% | 40% | 40% |

[1] A terpolymer of 79% 1,3-butadiene, 15% styrene and 15% 2-vinyl pyridine having a solids content of 40%.
[2] All dips were aged overnight before cutting down to 15% TSC (total solids content) for dipping.

Commercial aromatic polyamide tire cords were dipped in the above described cord dips with the following results.

H-ADHESION IN NEWTON OF KEVLAR TO VARIOUS STOCKS

| | | RESIN No. | | | | | |
|---|---|---|---|---|---|---|---|
| | | 13 | | 14 | | 15 | |
| STOCK | DIP RECIPE | RT | 121° C | RT | 121° C | RT | 121° C |
| B | 1 | 241 | 176 | — | — | — | — |
| | 2 | 286 | 181 | 278 | 162 | 280 | 165 |
| | 3 | 274 | 168 | — | — | — | — |
| C | 1 | 270 | 155 | — | — | — | — |
| | 2 | 292 | 165 | 263 | 133 | 254 | 142 |
| | 3 | 258 | 151 | — | — | — | — |
| A | 1 | 204 | 141 | — | — | — | — |
| | 2 | 217 | 143 | 196 | 107 | 196 | 116 |
| | 3 | 193 | 131 | — | — | — | — |

EXAMPLE V

This example illustrates the effect of resin/latex ratio using 20, 15 and 10 parts of the resin/100 parts of the latex. Resin 16, the preparation of which is set forth below, was used.

| | Resin No. 16 |
|---|---|
| Recipe (moles) | |
| Phenol | 1.00 |
| Formaldehyde | 3.00 |
| Sodium Hydroxide | 0.0375 |
| Water | 9.36 |
| Reaction temp., ° C | 80 |
| Reaction time, hrs. | 3 |
| Unreacted Formaldehyde | 8.40% |
| pH | 8.2 |
| Brookfield Visc., cps. | 16.5 |
| Water Tolerance, % | |
| TSC, % | 44.5 |

The resin produced above was then incorporated into a series of three cord dips, the recipes of which are set forth below.

| CONTENTS | DIP RECIPE No. | | |
|---|---|---|---|
| (PARTS) | 1 | 2 | 3 |
| Vinyl pyridine latex[1] | 100 | 100 | 100 |
| Resin | 16.7 | 15.4 | 12.5 |
| Resorcinol | 3.3 | 4.6 | 7.5 |
| TSC[2] | 40% | 40% | 40% |

[1] A terpolymer of 79% 1,3-butadiene, 15% styrene and 15% 2-vinyl pyridine having a solids content of 40%.
[2] All dips were aged overnight before cutting down to 15% TSC (total solids content) for dipping.

Commercial aromatic polyamide tire cords were dipped in the above described cord dips and incorporated into rubber stocks A, B and C with the following results.

H-ADHESION IN NEWTON OF KEVLAR TO VARIOUS STOCKS

| | | RESIN/LATEX RATIO | | | | | |
|---|---|---|---|---|---|---|---|
| | | 20:100 | | 15:100 | | 10:100 | |
| STOCK | DIP RECIPE | RT | 121° C | RT | 121° C | RT | 121° C |
| B | 1 | 241 | 176 | 266 | 173 | 281 | 160 |
|   | 2 | 286 | 181 | 298 | 184 | 275 | 169 |
|   | 3 | 274 | 168 | 257 | 147 | 277 | 165 |
| C | 1 | 270 | 155 | 263 | 143 | 248 | 124 |
|   | 2 | 292 | 165 | 248 | 150 | 249 | 131 |
|   | 3 | 258 | 151 | 236 | 118 | 246 | 126 |
| A | 1 | 204 | 141 | 199 | 131 | 190 | 121 |
|   | 2 | 217 | 143 | 196 | 136 | 181 | 105 |
|   | 3 | 193 | 131 | 176 | 110 | 180 | 106 |

For Stock B the H-adhesion does not appreciably decrease as the resin/latex ratio decreases. As little as 10 parts of the resin per 100 parts of the latex may, therefore, be used for Kevlar adhesion to Stock B. For Stocks A and C, however, H-adhesion gradually decreases as the resin/latex ratio is decreased. Adhesions at 15 parts resin/100 parts latex are adequate. Thus, while 20 parts resin/100 parts latex is preferred, 15 parts resin/100 parts latex may also be used without significant loss of adhesion to the three stocks.

The advantage in using lower resin/latex ratio lies in increased dip stabilities. At 50° C, the dips solidified in 2-3, 4-8 and 10-20 days for resin levels of 20, 15 and 10 parts per 100 parts of the latex, respectively.

EXAMPLE VI

This example illustrates the effect of aging the cord dip upon subsequent adhesion of rubber stock to dipped cord.

A cord dip phenol formaldehyde resole was prepared as follows.

| | Resin No. 17 |
|---|---|
| Recipe (moles) | |
| Phenol | 1.00 |
| Formaldehyde | 3.00 |
| Sodium Hydroxide | 0.075 |
| Water | 9.36 |
| Reaction temp., ° C | 80 |
| Reaction time, hrs. | 1 |
| Unreacted Formaldehyde | 7.87% |
| pH | 9.0 |
| Brookfield Visc., cps | 15.5 |
| Water Tolerance, % | 10,000+ |
| TSC, % | 45.0 |

The resin produced above was then incorporated into a series of two cord dips, the recipes of which are set forth below.

DIP RECIPES

| | Dip Recipe No. | |
|---|---|---|
| Contents (Parts) | 2 | 3 |
| Vinyl pyridine latex[1] | 100 | 100 |
| Resin | 15.4 | 12.5 |
| Resorcinol | 4.6 | 7.5 |
| TSC[2] | 40% | 40% |

[1] A terpolymer of 70% 1,3-butadiene, 15% styrene and 15% 2-vinyl pyridine having a solids content of 40%.
[2] All dips were aged overnight before cutting down to 15% TSC (total solids content) for dipping.

Commercial aromatic polyamide tire cords were dipped in the above described cord dips with the following results.

| H-ADHESION IN NEWTON OF KEVLAR TO STOCK B | | |
|---|---|---|
| DIP RECIPE | RT AFTER ONE DAY | RT AFTER ONE MONTH |
| 2 | 278 | 285 |
| 3 | 275 | 252 |

The above results suggest that dip aging does not adversely affect adhesion.

EXAMPLES VII THRU X

Examples VII, VIII, IX and X show the data for the effect of phenol:formaldehyde ratio of phenol formaldehyde resoles on the adhesion of glass, nylon, polyester (primer coated), and rayon, respectively, to appropriate rubber stocks. The PF resoles used represent phenol:formaldehyde mole ratio range of 1:1 to 1:3. For each cord, the adhesions gradually increase as the phenol:formaldehyde mole ratio goes from 1:1 to 1:3. The data show that the preferred range of phenol:formaldehyde mole ratio of the PF resoles is between 1:2 to 1:3. No particular advantage is expected if phenol:formaldehyde mole ratio of 1:>3 is used.

The data in Examples VII-X also show the effect of PF resole:resorcinol formaldehyde novolak ratio on the adhesion of various cords to rubber. The total amount of resin used in these dips was 20 parts/100 parts of latex solids. This level of resin was chosen based on our previous observations that for this and other similar dip systems, the optimum adhesion is generally obtained with the dips containing 15-25 parts resin/100 parts of latex solids.

For PF resoles of interest (those with phenol formaldehyde mole ratio in the range 1:2 to 1:3) the optimum adhesions for all cords lie in PF resole : curing agent range of 15:5 to 10:10. For glass, rayon, and polyester tire cords a ratio of 12.5/7.5 is generally found to be the optimum whereas for nylon dip a ratio of 15:5 gives the optimum adhesion.

This observation on nylon is identical to our earlier observations on Kevlar (another polyamide fiber) where a ratio of 15:5 generally gave the optimum adhesions. From all the data collected, so far, a ratio of 15:5 is preferred for use with the polyamide fibers and a ratio of 12.5:7.5 is preferred for use on glass, rayon, and polyesters.

The optimum adhesions obtained with the PF resoles prepared with phenol formaldehyde mole ratio of 1:3 are comparable to the corresponding adhesions obtained with the conventional dips on all cords. The adhesives presently in use provide adhesions (RT and 121° C) of 150 and 100 newtons on glass, 230 and 150 newtons on nylon, 220 and 140 newtons on rayon, and 270 and 170 newtons on polyester (D-417 primer coated) on the average.

A series of nine phenol formaldehyde resoles labelled Resins 18 thru 26 were prepared by reacting appropriate amounts of phenol and formaldehyde. Sodium hydroxide was used as the catalyst. The mole ratio of phenol formaldehyde was varied between 1:1.00 to 1:3.00. The mole ratio of phenol to catalyst used was 1:0.075 and 1:.0375. The reaction temperature used was 80° C. Reaction times of 1 hour to 3 hours were used. The recipes and the physical properties of various phenol formaldehyde resoles used in this study are given in the following table.

pers, Inc.) to a latex. The latex used unless otherwise specified was a terpolymer of 70% 1,3-butadiene, 15% styrene and 15% 2-vinyl pyridine having a solids content of 40%. The ratio (dry basis) of total resin/latex used varied between 10/100 to 20/100, although 20/100 was the most commonly used ratio. The ratio of phenol formaldehyde resole/Penacolite was varied between 20/0 to 10/10. All dips were prepared at 40% TSC.

The procedure for making the dips was as follows. Appropriate amount of phenol formaldehyde resole was weighed and the required amount of water was added. Appropriate amount of resorcinol was then added to the above and mixed well. The resin mixture was then slowly added to the latex while stirring. The dip was stirred for about 30 minutes to get good mixing. All dips were aged at least overnight before reduction to the TSC levels for use.

| | Dip Recipes | | | | |
|---|---|---|---|---|---|
| | | | Recipe No. | | |
| Contents | 6 | 7 | 8 | 9 | 10 |
| (Dry parts) | | | | | |
| Latex | 100 | 100 | 100 | 100 | 100 |
| PF resole | 20 | 17.5 | 15.0 | 12.5 | 10.0 |
| Resorcinol | 0 | 2.5 | 5.0 | 7.5 | 10.0 |

Commercial sized glass cords obtained from Owens Corning Fiberglass were dipped in the above described cord dips with the following results.

EXAMPLE VIII TABLE

EFFECT OF PHENOL FORMALDEHYDE RATIO OF PF RESOLES ON THE H-ADHESION OF GLASS[1]

| | RESIN USED | | | | | | | | | | | |
|---|---|---|---|---|---|---|---|---|---|---|---|---|
| Testing Temp. | 20 | | 19 | | 18 | | 21 | | 22 | | 23 | |
| P/F, Moles | RT | 121° C | RT | 121° C | RT | 121° C | RT | 121° C | RT | 121° C | RT | 121° C |
| Dip Recipe | 1:1.0 | | 1:1.25 | | 1:1.5 | | 1:3.0 | | 1:2.0 | | 1:2.5 | |
| 6 | 94 | 60 | 120 | 69 | 116 | 73 | 142 | 82 | 131 | 80 | 122 | 75 |
| 7 | 111 | 73 | 124 | 70 | 127 | 78 | 137 | 94 | 147 | 86 | 142 | 85 |
| 8 | 124 | 64 | 136 | 75 | 127 | 80 | 151 | 93 | 147 | 86 | 151 | 95 |
| 9 | 129 | 74 | 135 | 74 | 136 | 79 | 170 | 97 | 145 | 79 | 165 | 97 |
| 10 | 144 | 81 | 142 | 76 | 142 | 78 | 166 | 101 | 139 | 79 | 155 | 88 |

[1]OCF glass cord, ECG-15, 1/0
Dipping conditions: 40% TSC, 218° C, 60 seconds, 0% stretch, Orifice No. 71 having a 0.066 cm diameter opening
Rubber Stock Used: Stock A

RESIN NO.

| | 18 | 19 | 20 | 21 | 22 | 23 | 24 | 25 | 26 |
|---|---|---|---|---|---|---|---|---|---|
| Recipe (moles) | | | | | | | | | |
| Phenol | 1.00 | 1.00 | 1.00 | 1.00 | 1.00 | 1.00 | 1.00 | 1.00 | 1.00 |
| Formaldehyde 1.50 | 1.25 | 1.00 | 3.00 | 2.00 | 2.50 | 2.50 | 2.00 | 3.00 | |
| Sodium Hydroxide | 0.075 | 0.075 | 0.075 | 0.075 | 0.075 | 0.075 | 0.075 | 0.075 | 0.0375 |
| Water | 5.30 | 5.02 | 4.74 | 9.36 | 6.11 | 7.91 | 7.91 | 6.11 | 9.36 |
| Reaction Temp., ° C | 80 | 80 | 80 | 80 | 80 | 80 | 80 | 80 | 80 |
| Reaction Time, hrs. | 1.25 | 1.25 | 1.25 | 1 | 1 | 1 | 1 | 1 | 3 |
| Free Formladehyde content | 0.51% | 0.24% | — | 7.04% | 4.67% | 3.30% | 5.70% | 2.50% | 8.56% |
| pH | 9.3 | 9.3 | 9.3 | 9.2 | 9.25 | 9.4 | 9.00 | 9.00 | 8.25 |
| Brookfield Viscosity, cps. | 22.5 | 18.0 | — | 18.0 | — | — | 17.5 | | 14.5 |
| Water Tolerance[1], % | 700 | 1300 | ∞ | 570 | 970 | 1400 | 400 | | 250 |
| Calculated TSC[2], % | 60 | 60 | 60 | 45.0 | 49.0 | 54.0 | 59.7 | 54.0 | 44.7 |

[1]Defined as the weight percent of water added before turbidity appears
[2]Calculated on the basis of total phenol consumption. Some unreacted phenol is present in all resoles (thin layer chromatography and $C^{13}$ NMR)

Dips were prepared by adding varying amounts of phenol formaldehyde resoles and Penacolite R-2170 (a resorcinol formaldehyde Novolak resin made by Koppers, Inc.) to a latex.

Commercial nylon cords were dipped in the above described dips with the following results.

EXAMPLE VIII TABLE
EFFECT OF PHENOL FORMALDEHYDE RATIO OF PF RESOLES ON THE H-ADHESION OF NYLON 66[1]

| Testing Temp. P/F, Moles | RESIN USED | | | | | | | | | | | |
|---|---|---|---|---|---|---|---|---|---|---|---|---|
| | 20 | | 19 | | 18 | | 24 | | 25 | | 26 | |
| | RT | 121° C | RT | 121° C | RT | 121° C | RT | 121° C | RT | 121° C | RT | 121° C |
| Dip Recipe | 1:1.0 | | 1:1.25 | | 1:1.5 | | 1:2.5 | | 1:2.0 | | 1:3.0 | |
| 6 | 122 | 65 | 154 | 90 | 142 | 90 | — | — | — | — | — | — |
| 7 | 137 | 79 | 188 | 118 | 207 | 128 | — | — | — | — | 216 | — |
| 8 | 147 | 90 | 186 | 100 | 213 | 134 | 210 | 130 | 198 | 132 | 222 | — |
| 9 | 131 | 75 | 150 | 87 | 208 | 135 | — | — | — | — | 216 | — |
| 10 | 113 | 66 | 130 | 68 | 179 | 95 | — | — | — | — | 199 | — |

[1]840/2/2 cord
Dipping Conditions: 20% TSC, 238° C, 80 seconds, 8% stretch
Rubber Stock Used: Stock A Commercial polyester cords were dipped in the above described dips with the following results. The polyester cords used were commercial cords obtained from DuPont. They were primed with DuPont D-417 primer. D-417 primer is a mixture of an epoxy resin and a diisocyanate (Hylene M.P.) which cures on the cord surface.

also be important to mention that the PF resole used for nylon dips was different from that used for rayon and polyester dips in that the former contained only half as much sodium hydroxide (catalyst) as the latter.

Two phenol formaldehyde resoles labeled Resin 27 and 28 in the following table were prepared. The ingre-

EXAMPLE IX TABLE
EFFECT OF PHENOL FORMALDEHYDE RATIO OF PF RESOLES ON THE H-ADHESION OF POLYESTER

| Testing Temp. P/F Moles | RESIN USED | | | | | | | | | | | |
|---|---|---|---|---|---|---|---|---|---|---|---|---|
| | 20 | | 19 | | 18 | | 21 | | 22 | | 23 | |
| | RT | 121° C | RT | 121° C | RT | 121° C | RT | 121° C | RT | 121° C | RT | 121° C |
| Dip Recipe | 1:1.0 | | 1:1.25 | | 1:1.50 | | 1:3.0 | | 1:2.0 | | 1:2.5 | |
| 6 | 101 | 49 | 109 | 56 | 114 | 69 | 194 | 131 | 178 | 115 | 187 | 124 |
| 7 | 115 | 70 | 127 | 76 | 141 | 82 | 219 | 145 | 222 | 146 | 219 | 146 |
| 8 | 178 | 112 | 163 | 103 | 179 | 104 | 232 | 160 | 223 | 144 | 231 | 157 |
| 9 | 222 | 136 | 215 | 121 | 207 | 114 | 251 | 171 | 237 | 161 | 229 | 155 |
| 10 | 239 | 137 | 243 | 150 | 236 | 147 | 250 | 179 | 234 | 160 | 224 | 152 |

Dipping Conditions: 20% TSC, 221° C, 45 Seconds, 0% stretch Rubber Stock Used: Stock C Commercial rayon cords were dipped in the above described dips with the following results. The rayon cords had 1650 filaments in each stand and three strands per cord.

dients used on the reaction conditions are set forth in the table.

EXAMPLE X TABLE
EFFECT OF PHENOL FORMALDEHYDE RATIO OF PF RESOLE ON THE H-ADHESION OF RAYON

| Testing Temp. P/F, Moles | RESIN USED | | | | | | | | | | | |
|---|---|---|---|---|---|---|---|---|---|---|---|---|
| | 20 | | 19 | | 18 | | 21 | | 22 | | 23 | |
| | RT | 121° C | RT | 121° C | RT | 121° C | RT | 121° C | RT | 121° C | RT | 121° C |
| Dip Recipe | 1:1.0 | | 1:1.25 | | 1:1.50 | | 1:3.0 | | 1:2.0 | | 1:2.5 | |
| 6 | 164 | 81 | 199 | 112 | 217 | 134 | 167 | 88 | 156 | 82 | 149 | 75 |
| 7 | 172 | 87 | 187 | 94 | 187 | 110 | 173 | 100 | 192 | 100 | 170 | 88 |
| 8 | 189 | 88 | 188 | 95 | 199 | 115 | 208 | 116 | 220 | 128 | 209 | 119 |
| 9 | 185 | 83 | 184 | 94 | 196 | 110 | 240 | 152 | 228 | 129 | 246 | 142 |
| 10 | 170 | 73 | 183 | 88 | 194 | 105 | 246 | 134 | 188 | 109 | 231 | 121 |

Dipping Conditions: 20% TSC, 221° C, 45 seconds, 4% stretch Rubber Stock Used: Stock A

EXAMPLE XI

The effect of total resin (PF resole + Penacolite)/latex ratio was studied to arrive at an optimum range for use in adhesives on nylon, rayon, and polyester tire cords. The results are shown in Example XI Table. The data on polyester and rayon obtained are about 10% lower than normally observed. It is assumed that all the adhesion values for rayon and for polyester are low by about the same amount and that the trend showing the effect of resin/latex ratio in the Table is representative of the actual process. It is seen from the data in the Table that about 15 parts resin/100 parts latex gives the highest adhesion for nylon, whereas for rayon and polyester the optimum resin/latex ratio appears to be between 20-25 parts resin/100 parts latex solids. It may

| | RESIN NO. | |
|---|---|---|
| | 27 | 28 |
| Recipe (moles) | | |
| Phenol | 1.00 | 1.00 |
| Formaldehyde | 3.00 | 3.00 |
| Sodium Hydroxide | 0.0375 | 0.075 |
| Water | 9.36 | 9.36 |
| Reaction Temp.[1] ° C. | 80 | RT |
| Reaction Time, hrs. | 3 | 168 (7 days) |
| Free Formaldehyde Content | 8.56% | 9.90% |
| pH | 8.25 | 9.10 |
| Brookfield Viscosity, cps | 14.5 | 11.5 |
| Water Tolerance, % | 250 | ∞ |
| TSC, % | 44.7 | 44.2 |

[1]Temperature of the polymerizer bath

The resins produced above were then incorporated into a series of cord dips having resin/latex ratios of from 10:100 to 30:100. The ratios and the results are set forth in the table below.

DIP RECIPES
EFFECT OF RESIN/LATEX RATIO ON THE H-ADHESION
OF VARIOUS CORDS TO RUBBER

| Fiber | Resin 27 840/2/2 Nylon | | Resin 28 1650/3 Rayon | | Resin 28 1300/3 Polyester (D-417 primer) | |
|---|---|---|---|---|---|---|
| Resin[1]/Latex Ratio | RT | 121° C | RT | 121° C | RT | 121° C |
| 10:100 | 225 | — | — | — | — | — |
| 15:100 | 229 | — | 203 | 107 | 217 | 140 |
| 20:100 | 212 | — | 229 | 120 | 237 | 156 |
| 25:100 | — | — | 222 | 126 | 239 | 158 |
| 30:100 | — | — | 213 | 135 | 230 | 153 |

[1]Refers to PF resole + Penacolite. Ratio of PF resole/Penacolite used was 3/1 in all cases. Stock B was used. The dipping conditions were 20% TSC, 238° C, 80 seconds and 8% stretch.

EXAMPLE XII

A reduction in the vinyl pyridine content of the latex used in the makeup of the adhesive dip reduces the cost of the dip. Dips containing blends of the vinyl pyridine latex and 50-50 styrene/butadiene latex were studied as adhesives for nylon, polyester and kevlar tire cords. A dip recipe containing 100 parts of latex, 15 parts of phenol formaldehyde resole and 5 parts of Penacolite R-2170 was used in all cases.

The ingredients and reaction condition for making the resole used are set forth in the table below:

| | RESIN NO. 29 |
|---|---|
| Recipe (moles) | |
| Phenol | 1.00 |
| Formaldehyde | 3.00 |
| Sodium Hydroxide | 0.075 |
| Water | 9.36 |
| Reaction Temp., ° C | 70 |
| Reaction Time, hrs. | 3 |
| pH | 9.1 |
| Calculated TSC, % | 60 |

The results obtained by blending the expensive vinyl pyridine latex with a relatively inexpensive butadiene styrene latex are set forth in the following table.

EXAMPLE XII TABLE
EFFECT OF LATEX COMPOSITION
ON THE H-ADHESION OF VARIOUS CORDS

| Ratio of Vinyl Pyridine Latex to Styrene Butadiene Latex | Kevlar RT Stock B | Nylon RT Stock A | Polyester (D-417 Primer Dip) RT Stock C |
|---|---|---|---|
| 100:0 | 275 | 212 | 272 |
| 75:25 | 268 | 222 | 285 |
| 50:50 | 265 | 239 | 285 |
| 25:75 | 253 | 226 | 267 |
| 0:100 | 239 | 152 | 201 |

| CORD SPECIFICATIONS AND DIPPING CONDITIONS | |
|---|---|
| Polyester (1300/3), D-417 primer coated: | 221° C, 45 sec., 0%stretch |
| Nylon 66 (840/2/2): | 238° C, 40 sec., 8% stretch |
| Kevlar (1500/3): | 232° C, 90 sec., 2% stretch |

EXAMPLE XIII

Effect of PF Resole Aging on Adhesion

In addition to being cheaper, phenol formaldehyde (PF) resoles have another advantage over the resorcinol based resoles presently being used in the tire cord adhesive dips. The useful shelf life on PF resoles is considerably higher than that of the resorcinol formaldehyde resoles. Depending upon their preparation, PF resoles may be useful for up to 100 days at room temperature (RT) whereas the resorcinol formaldehyde resoles barely last three days. The effect of aging (at RT) on the adhesive quality of PF resoles was studied for the adhesion of nylon, rayon, and polyester to rubber. The resoles used were prepared at room temperature. A standard dip recipe was used.

The adhesion data showing the effect of resole age on its adhesive quality show that the adhesive quality of PF resoles prepared at room temperature is not affected even after 100 days aging. PF resoles prepared at higher temperatures (>25° C) have somewhat shorter useful shelf life (40–60 days).

EXAMPLE XIV

The cord dips disclosed in the previous examples contained either resorcinol or resorcinol formaldehyde (RF) novolaks prepared with an acid catalyst.

The resorcinol formaldehyde novolaks or resorcinol can be replaced by resorcinol formaldehyde resins prepared in the alkaline medium. Pertinent data on the preparation of resorcinol formaldehyde resins, dip formulations and adhesion are given in Example XVI Tables I, II and III, respectively.

The adhesion data in Table III show that the RF resins prepared in the alkaline medium perform as well as resorcinol in these dips for the adhesion of various cords to rubber.

TABLE I
EXAMPLE XIV
PREPARATION OF RESORCINOL FORMALDEHYDE
(RF) RESIN BASED CURING AGENTS

| Contents | | Curing Agent 1 | 2 | 3 |
|---|---|---|---|---|
| Deionized Water | | 181.6 g | 210.6 g | 238.5 g |
| Sodium Hydroxide (100%) | | 0.3 | 0.3 | 0.3 |
| Resorcinol (100%) | | 11.0 | 11.0 | 11.0 |
| Formaldehyde (37%) | | 4.1 | 8.1 | 16.2 |
| | Total | 197.0 g | 220.0 g | 266.0 g |
| Theoretical TSC | | 6.5% | 6.5% | 6.5% |

TABLE I-continued
EXAMPLE XIV
PREPARATION OF RESORCINOL FORMALDEHYDE (RF) RESIN BASED CURING AGENTS

| Contents | Curing Agent 1 | 2 | 3 |
|---|---|---|---|
| Reaction Temp., °C | 25 | 25 | 25 |
| Reaction Time, hrs. | 6 | 6 | 6 |
| Resorcinol Formaldehyde (mole ratio) | 1/0.5 | 1/1 | 1/2 |

TABLE II
EXAMPLE XIV
PREPARATION OF ADHESIVE DIPS

| Contents | | A | B | C | D |
|---|---|---|---|---|---|
| Vinyl Pyridine Latex[1] | | 122.0 | 122.0 | 122.0 | 122.0 |
| PF resin (45%)[2,3] | | 16.3 | 16.3 | 16.3 | 16.3 |
| Resorcinol (100%) | | 2.5 | — | — | — |
| Curing Agent1(6.5%) | | — | 38.5 | — | — |
| Curing Agent2(6.5%) | | — | — | 38.5 | — |
| Curing Agent3(6.5%) | | — | — | — | 38.5 |
| Deionized Water | | 159.2 | 123.2 | 123.2 | 123.2 |
| | Total | 300 | 300 | 300 | 300 |
| TSC | | 20% | 20% | 20% | 20% |

[1]41% total solids
[2]Phenol formaldehyde resin prepared at 70° C.
[3]Mole ratios of phenol:formaldehyde:sodium hydroxide were 1/3/.075.

TABLE III
EXAMPLE XIV
H-ADHESION DATA

| Cord | Rayon | | Polyester (Desmodur TT primer) | | Kevlar | | Nylon | |
|---|---|---|---|---|---|---|---|---|
| | Stock D | | Stock C | | Stock B | | Stock A | |
| Dip | RT | 121° C | RT | 121° C | RT | 121° C | RT | 121° C |
| A | 202 | 122 | 239 | 159 | 238 | 145 | 202 | 144 |
| B | 208 | 134 | 229 | 154 | 248 | 155 | 235 | 168 |
| C | 204 | 126 | 225 | 150 | 247 | 153 | 217 | 172 |
| D | 195 | 122 | 216 | 152 | 244 | 148 | 258 | 187 |

Cord Processing Conditions:
Rayon 221° C, 60 sec., 4% stretch
Polyester (Desmodur TT primer) 221° C, 45 sec., 0% stretch
Kevlar 232° C, 90 sec., 2% stretch
Nylon 238° C, 80 sec., 8% stretch While the adhesive containing reinforcing elements of this invention can be adhered to a vulcanizable blend of natural rubber, polybutadiene rubber, and rubbery butadiene-styrene copolymer by curing the same in combination together, it is apparent that said adhesive containing reinforcing element can be adhered to other vulcanizable rubbery materials by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

Fibers, yarns, filaments, cords or fabric and the like coated with the adhesive of the present invention can have from about 3 to 7% by weight (dry) total solids from the adhesive dip on the cord based on the weight of the cord and can be used in the manufacture of radial, bias, or belted-bias passenger tires, truck tires, motorcycle and bicycle tires, off-the-road tires, airplane tires, transmission belts, V-belts, conveyor belts, hose, gaskets, rubbers, tarpaulins, and the like.

The reinforcing elements which can be used are known in the art and described in detail in a large number of U.S. Patents.

What we claim is:

1. A process for making a cord dip containing a phenol formaldehyde resin which comprises:
    A. reacting in the presence of 0.01 to 0.8 moles of a base catalyst
        1. one mole of phenol with
        2. from about 1.0 to 4.0 moles of formaldehyde to form a reaction mixture containing phenol formaldehyde resin.
    B. without separating the phenol formaldehyde resin from the reaction mixture adding based on the following ingredients by dry weight
        1. a minor amount of a curing agent selected from the group consisting of resorcinol and resorcinol formaldehyde resin and
        2. a major amount of an alkaline dispersion of a rubbery vinyl pyridine 1,3-butadiene copolymer in which copolymer the vinyl pyridine is present as a minor component.

2. The process of claim 1 wherein the ratio of vinyl pyridine copolymer to the mixture of phenol formaldehyde resole and curing agent has a value of from 100:5 to 100:75.

3. The process of claim 1 wherein the ratio of vinyl pyridine copolymer to the mixture of phenol formaldehyde resole and curing agent has a value of from 100:10 to 100:35.

4. The process of claim 3 wherein the ratio of phenol formaldehyde to curing agent has a value of from 1:1 to 6:1.

5. The process of claim 3 wherein the ratio of phenol formaldehyde to curing agent has a value of from 1:1 to 3:1.

6. The process of claim 1 wherein from 0.0375 to 0.15 moles of base catalyst are used per mole of phenol.

7. The process of claim 1 wherein the ratio of phenol to formaldehyde in the phenol formaldehyde resin has a value of from 1:1.5 to 1:3.

8. The process of claim 1 wherein the vinyl pyridine latex is a blend containing styrene butadiene latex.

9. The process of claim 8 wherein the ratio of vinyl pyridine latex to styrene butadiene latex has a value of from 3:1 to 1:3.

10. The process of claim 9 wherein the total vinyl pyridine content of the blend is as least 3%.

11. The process of claim 1 wherein the curing agent is selected from the class consisting of resorcinol and resorcinol formaldehyde.

12. The process of claim 1 wherein the curing agent is a resorcinol formaldehyde novolak.

13. A composition produced by the method of claim 1.

* * * * *